United States Patent
Horton et al.

(10) Patent No.: US 7,603,482 B2
(45) Date of Patent: Oct. 13, 2009

(54) DNS COMPATIBLE PNRP PEER NAME ENCODING

(75) Inventors: Noah Horton, Sammamish, WA (US); Ravi T. Rao, Redmond, WA (US); Radu Simionescu, Redmond, WA (US); Todd R. Manion, Redmond, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/112,040

(22) Filed: Apr. 22, 2005

(65) Prior Publication Data
US 2006/0242301 A1 Oct. 26, 2006

(51) Int. Cl.
G06F 15/16 (2006.01)
(52) U.S. Cl. .................................. 709/245; 709/246
(58) Field of Classification Search ........................ None
See application file for complete search history.

(56) References Cited

U.S. PATENT DOCUMENTS

| | | | |
|---|---|---|---|
| 6,314,469 B1 * | 11/2001 | Tan et al. | 709/245 |
| 6,446,133 B1 * | 9/2002 | Tan et al. | 709/245 |
| 7,051,102 B2 | 5/2006 | Gupta et al. | |
| 7,065,587 B2 * | 6/2006 | Huitema et al. | 709/245 |
| 2002/0143989 A1 | 10/2002 | Huitema et al. | |
| 2004/0111515 A1 | 6/2004 | Manion et al. | |
| 2004/0190549 A1 | 9/2004 | Huitema | |
| 2005/0004916 A1 | 1/2005 | Miller et al. | |
| 2005/0091529 A1 | 4/2005 | Manion et al. | |
| 2005/0108371 A1 | 5/2005 | Manion et al. | |
| 2005/0177715 A1 | 8/2005 | Somin et al. | |
| 2006/0136551 A1 | 6/2006 | Amidon et al. | |

OTHER PUBLICATIONS

International Search Report for PCT/US05/27395 mailed Oct. 19, 2006.
Written Opinion for PCT/US05/27395 mailed Oct. 19, 2006.
Costello, A., "Punycode: A Bootstring Encoding of Unicode for Internationalized Domain Names in Applications (IDNA)," The Internet Society, 2003, http://www.fazs.org/rfcs/rfc3492.html, 27 pages.
Mockapetris, P., "Domain Names—Implementation and Specification," Nov. 1987, http://www.ietf.org/rfc/rfc1035.txt, 52 pages.
Teredo Overview, Microsoft Corporation, website, 30 pages available at http://www.microsoft.com/technet/prodtechnol/winxppro/maintain/teredo.mspx, © 2003 Microsoft Corporation.

\* cited by examiner

*Primary Examiner*—Yemane Mesfin
(74) *Attorney, Agent, or Firm*—Marshall, Gerstein & Borun LLP

(57) ABSTRACT

A method of converting a peer name to a PNRP DNS is disclosed. The method may take a peer name and encode it into a common DNS name. The method may also take a PNRP DNS name and convert it to a peer name.

7 Claims, 3 Drawing Sheets

DNS COMPATIBLE PNRP PEER NAME ENCODING

BACKGROUND

Peer-to-peer networking is the utilization of the relatively powerful computers (personal computers) that exist at the edge of a network or the Internet for more than just client-based computing tasks. The modern PC has a very fast processor, vast memory, and a large hard disk, none of which are being fully utilized when performing common computing tasks such as e-mail and Web browsing. The modern PC can easily act as both a client and server (a peer) for many types of applications.

The typical computing model for many applications is a client/server model. A server computer typically has vast resources and responds to requests for resources and data from client computers. Client computers initiate requests for resources or data from server computers. A good example of the client/server model of computing is Web browsing. Web servers on the Internet are typically high-end dedicated server computers with very fast processors (or multiple processors) and huge hard disk arrays. The Web server stores all of the content associated with a Web site (HTML files, graphics, audio and video files, etc.) and listens for incoming requests to view the information on a particular Web page. When a page is requested, the Web server sends the page and its associated files to the requesting client.

The protocol used to send messages between peers for name resolution and peer discovery is Peer Name Resolution Protocol (PNRP). PNRP uses multiple clouds, in which a cloud is a grouping of computers that use addresses of a specific scope. A scope is an area of the network over which the address is unique. PNRP clouds are based on the address scopes for IPv6 addresses.

A peer name is an endpoint for communication, which can be a computer, a user, a group, a service, or anything else that is desired to resolve to an IPv6 address, protocol, and port number. PNRP IDs are 256 bits long and are composed of the following:

The high-order 128 bits, known as the peer-to-peer ID, are a hash of a peer name assigned to the endpoint.

The low-order 128 bits are used for the service location, which is a generated number that uniquely identifies different instances of the same peer to peer ID in the same cloud.

The 256-bit combination of peer to peer ID and service location allows multiple PNRP IDs to be registered from a single computer.

The ability to translate names from a server based environment to a peer to peer based environment will become even more important as peer to peer computing increases in use.

SUMMARY

A method of converting a peer name to a PNRP DNS is disclosed. The method may take a peer name and encode it into a common DNS host name. The method may also take a PNRP DNS name and convert it to a peer name. A computer readable medium with computer executable code and a computer system that executes computer code in accordance with the method is also disclosed.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
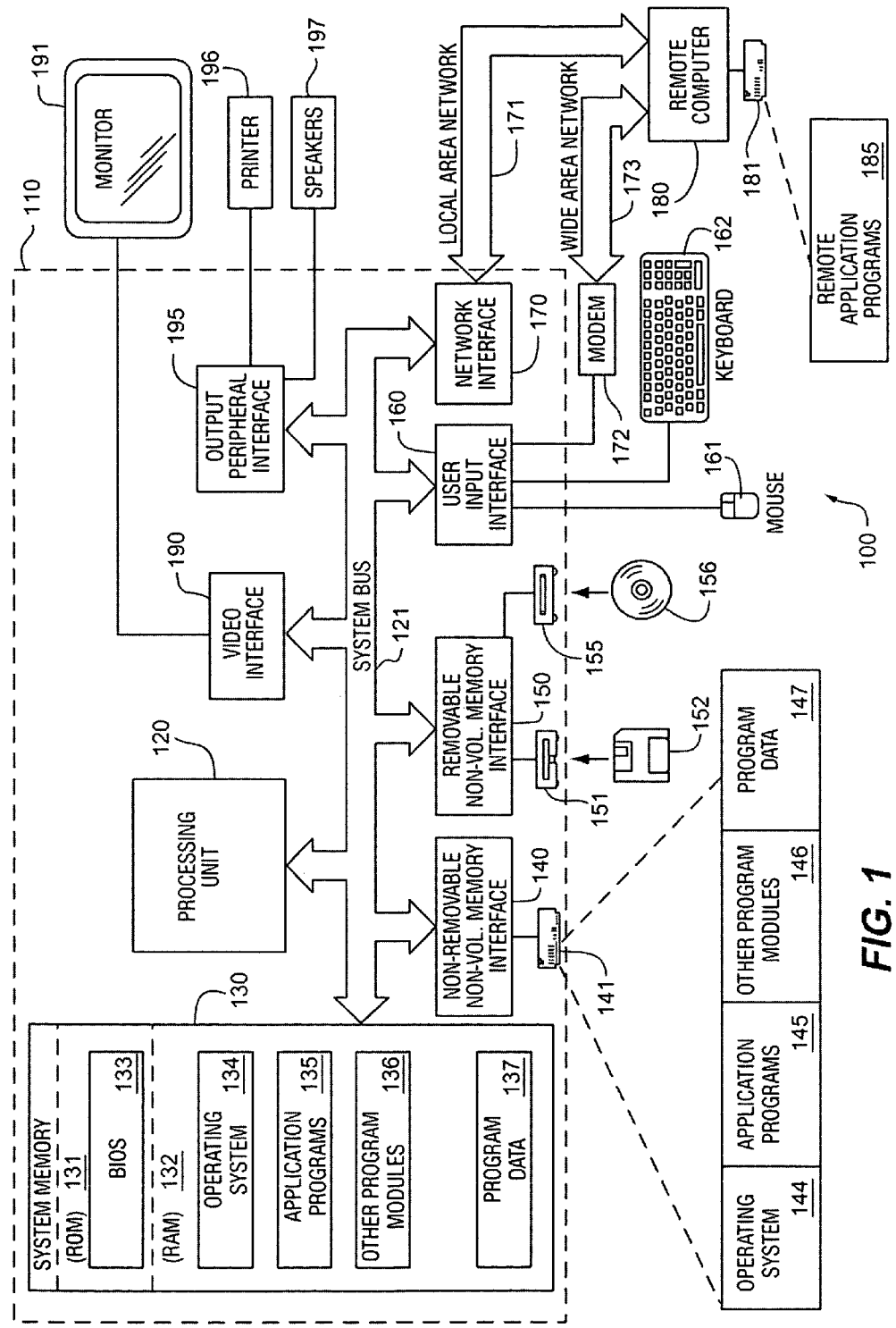
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

PNRP ("Peer Name Resolution Protocol") is a name resolution protocol which may be serverless and that allows for machines to resolve names to IP addresses without the use of servers. The basic format for PNRP Peer names is a unique format. As PNRP peer names may not be natively understood by all applications that understand DNS host names, a mechanism may be needed to translate peer names into more universal Domain Name Service (DNS) host names.

Figure 2:
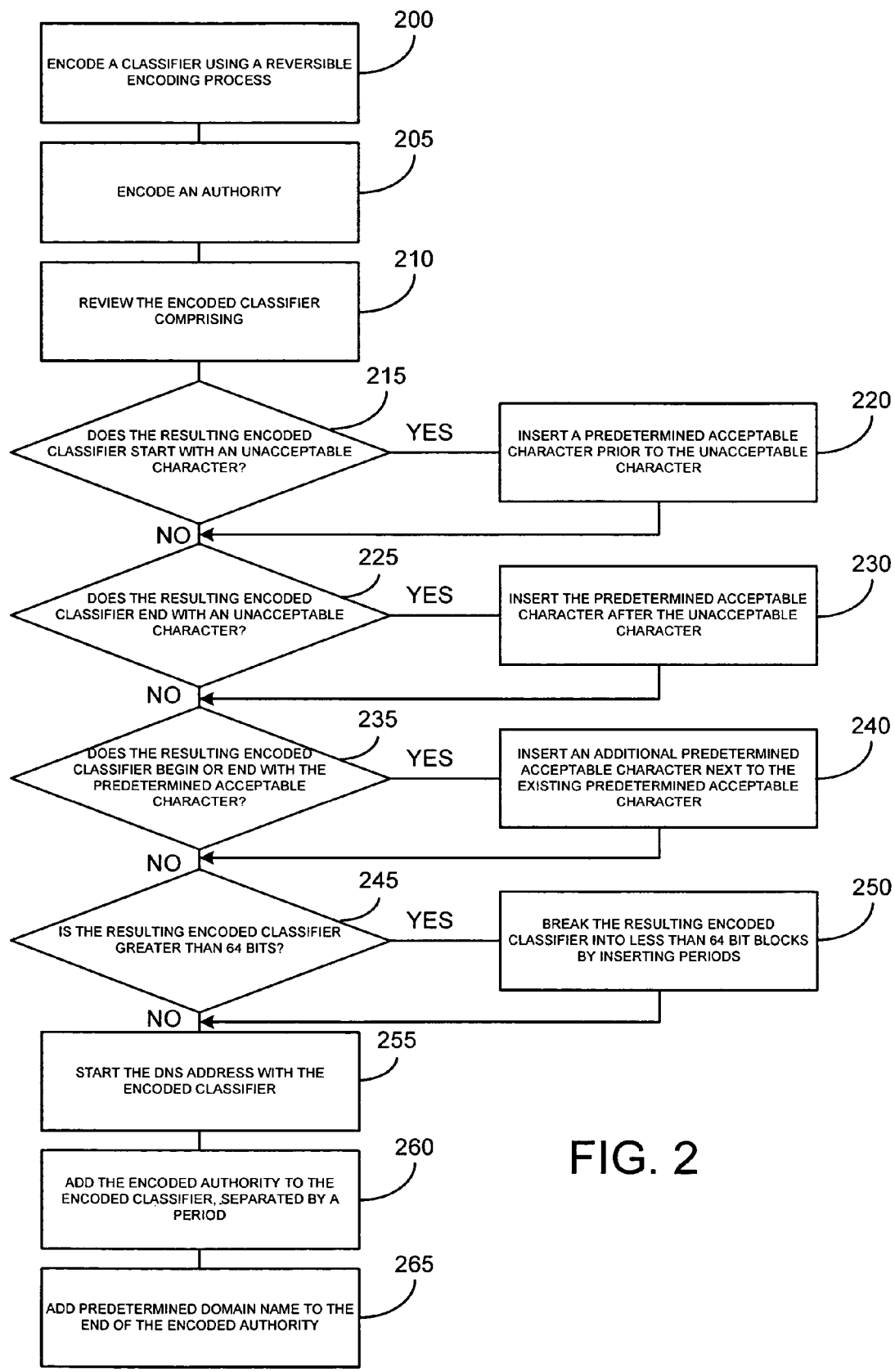
FIG. 2 is an illustration of a method of converting a peer name to a PNRP DNS name.

FIG. 2 may illustrate a method of converting a peer name to a PNRP DNS-encoded name. At block 200, a classifier may be encoded using a reversible encoding process. The encoding process may use tradition punycode encoding as described in RFC 3492, which is hereby incorporated by reference.

In another embodiment, the parameters for PNRP may similar to punycode with some differences. 1. In the PNRP case the "extended set" may be Unicode and the "basic set" may be ('a'-'z', '0'-'9', '-')

This means the numeric equivalents of each code point are:
61 . . . 7A (a-z)=0 to 25, respectively
30 . . . 39 (0-9)=26 to 35, respectively
The bootstring parameter values may be:
base=36
tmin=1
tmax=26
skew=38
damp=700
initial_bias=72
initial_n=1

Only ('a'-'z', '0'-'9') characters may be part of basic character set (in punycode, all characters lower than 0x80 may be valid basic characters).

Some encoding examples may be as follows:
Plain: Where do you want to go today?™
Encoded: heredoyouwanttogotoday-ruacdeccf34gpu4905f
Plain: quake
Encoded: quake- At block 205, an authority may be encoded. The encode may require that an acceptable character, such as the character 'p' be inserted before the authority. In another embodiment, if the authority name is not secure, the authority may be encoded as 'p0'. The authority may be limited to 40 hex characters.

At block 210, the encoded classifier may be reviewed. The classifier may be limited to a length of not more than 149 bits. At block 215, a decision may be made whether the resulting encoded classifier starts with an unacceptable character. If the decision at block 215 is yes, at block 220, a predetermined acceptable character may be inserted prior to the unacceptable character and control may pass to block 225. Examples of unacceptable characters may include numbers and dashes or other symbols that been defined as being unacceptable by the relevant authority. An example of an acceptable character may be the letter "p". If the decision at block 215 is no, then control may pass to block 225.

At block 225, a decision may be made whether the resulting encoded classifier ends with an unacceptable character. If the decision at block 225 is yes, then control may pass to block 230 where the predetermined acceptable character may be inserted after the unacceptable character and control may pass to block 235. If the decision at block 225 is no, control may pass to block 235.

At block 235, a decision may be made whether the resulting encoded classifier begins or end with the predetermined acceptable character. If the decision at block 235 is yes, control may pass to block 240 where an additional predetermined acceptable character may be inserted next to the existing predetermined acceptable character and control may pass to block 245. If the decision at block 235 is no, control may pass to block 245.

At block 245, a decision may be made whether the resulting encoded classifier is greater than 63 characters. If the decision at block 244 is yes, at block 250, the resulting encoded classifier may be broken down into less than or equal to 63 character blocks by inserting periods to ensure no block is longer than 63 characters. Control then may pass to block 255. If the decision at block 245 is no, control may pass to block 255.

At block 255, the DNS host name may be created by beginning with the encoded classifier. At block 260, the encoded authority may be added next to the encoded classifier, separated by a period. At block 265, a predetermined domain name such as pnrp.net may be added to the end of the encoded authority. The resulting DNS name may be required to be less than 255 characters.

At a high level, the method may take a peer name such as:
<Authority>.<Classifier>
and turn it into a PNRP DNS compatible name such as:
EncodedClassifier.EncodedAuthority.pnrp.net.

The DNS-encoded peer name may also include a cloud name which also may have to be encoded into the DNS-encoded peer name. The cloud name may be encoded using any known encoding scheme and may be inserted before ".pnrp.net". The cloud name may represent a global cloud, a site cloud, a local cloud, a specific site cloud and a link specific cloud. A cloud may further identify a particular address. A global cloud may further separate the universe of potential addresses into a smaller subset, such as addresses per continent would have the same cloud name. A site cloud may create a subset of addresses that use a common service provider, such as Comcast or Verizon, or corporation, such as Ford or Microsoft. A local cloud may include every machine that uses the same first level router. A specific site cloud may be all the machines on the same site. The site identifier may use IPV6 address concepts which may be 16 hex characters. The link specific cloud may be for machines on the same link and may use IPV6 addresses where the same first twelve hex characters but the final four hex characters may be different. Additional information on IPV6 addresses may be found at ipv6.org.

Figure 3:
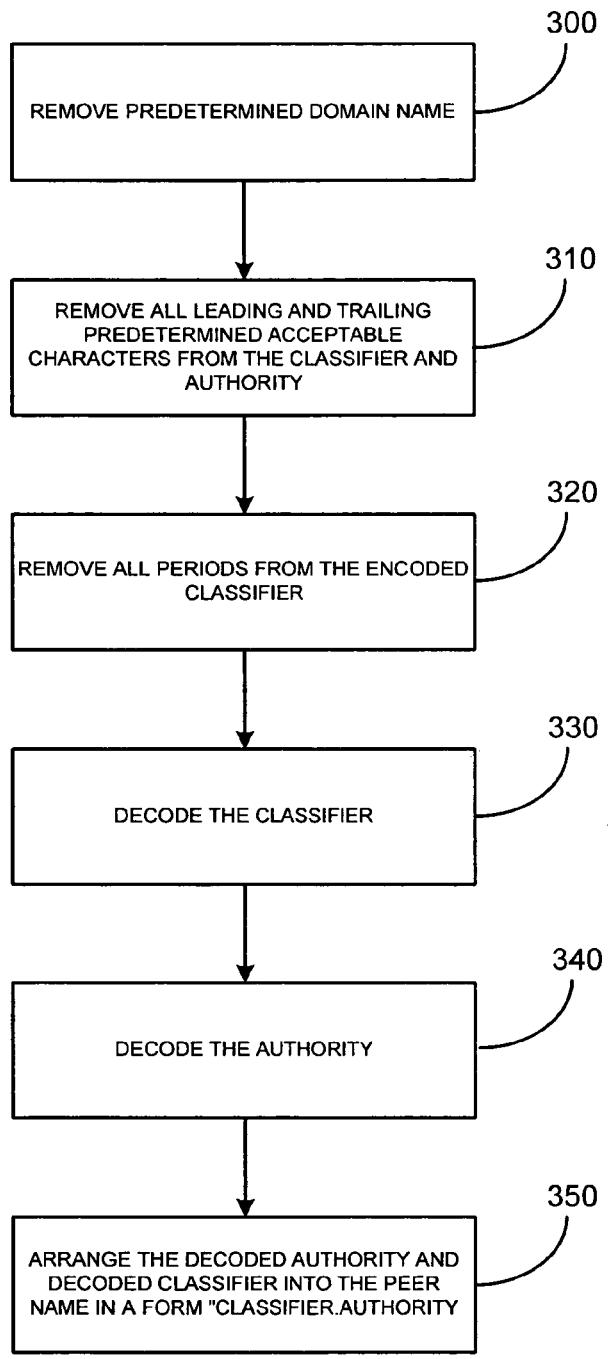
FIG. 3 is an illustration of a method of converting a PNRP DNS name to a peer name.

FIG. 3 may illustrate a method of converting a DNS-encoded peer name to a canonical peer name. The method may be similar to the reverse of the method described in FIG. 2.

At block 300, if a predetermined domain name such as PNRP.net is the ending character of the DNS name, the predetermined domain name (PNRP.net, for example) may be removed. At block 310, all leading and trailing predetermined acceptable characters may be removed from the classifier and authority. As previously describe, the acceptable character may be "p" and all leading and trailing "p"s may be removed.

At block 320, all periods may be removed from the encoded classifier. The classifier may have been longer than 63 characters and may have been broken into smaller parts by inserting periods. These periods may need to be removed prior to decoding.

At block 330, the classifier may be decoded. The same scheme used to encode the data may be used to decode the data. For example, if punycode was used to encode the data, reverse punycode may be used to decode the classifier.

At block 340, the authority may be decoded. The decoding may be as simple as ensure that an predetermined acceptable character are removed as described in block 300 or if another encoding scheme was used, the proper decoding scheme may be used to decode the authority using a hash function and a public key.

At block 350, the decoded authority and decoded classifier may be arranged into the peer name in a form "authority.classifier". The DNS-encoded peer name may also have a cloud name. The decoded cloud name may be decoded and added to the peer name using the form "cloud.authority.classifier". At a high level, the method may take a PNRP DNS compatible name such as:

EncodedClassifier.EncodedAuthority.pnrp.net.
and turn it into a peer name such as:
<Authority>.<Classifier>

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer readable storage medium storing computer executable code, when executed by a computer to convert a DNS-encoded peer name to a canonical peer name and to convert a peer name to a DNS-encoded peer name, wherein the computer executable code comprises computer code to:
   when the code is converting a peer name to a DNS encoded peer name:
      encoding a classifier using a reversible encoding process;
      encoding an authority;
      reviewing the encoded classifier, comprising:
         if the resulting encoded classifier start with an unacceptable character, inserting a predetermined acceptable character prior to the unacceptable character;
         if the resulting encoded classifier end with an unacceptable character, inserting the predetermined acceptable character after the unacceptable character;
         if the resulting encoded classifier begin or end with the predetermined acceptable character, inserting an additional predetermined acceptable character next to the existing predetermined acceptable character;
         if the resulting encoded classifier is greater than 63 characters, breaking the resulting encoded classifier into less than or equal to 63 character blocks by inserting periods;
      starting DNS name address with the encoded classifier;
      adding the encoded authority to the encoded classifier, separated by a period;
      adding a predetermined domain name to the end of the encoded authority; and
   when the computer code is converting a DNS-encoded peer name to a canonical peer name:
      if a predetermined domain name is the ending character of the DNS name, removing the predetermined domain name;
      removing all leading and trailing predetermined acceptable characters from the classifier and authority;
      removing all periods from the encoded classifier;
      decoding the classifier; decoding the authority using a hash function and a public key;
      arranging the decoded authority and decoded classifier into the peer name in a form "authority.classifier".

2. The computer readable storage medium of claim 1, further comprising using punycode standard to encode.

3. The computer readable storage medium of claim 1, wherein the peer name further comprises a cloud name.

4. The computer readable storage medium of claim 1, wherein the cloud name is inserted before the predetermined domain name and after the encoded authority.

5. The computer readable storage medium of claim 1, further comprising using reverse punycode to decode the classifier.

6. The computer readable storage medium of claim 1, further comprising decoding a cloud name that further identifies the peer name and that is assembled in the form "cloud..authority.classifier".

7. The computer readable storage medium of claim 1, wherein the DNS-encoded peer name is shorter than 255 characters.

* * * * *

UNITED STATES PATENT AND TRADEMARK OFFICE
CERTIFICATE OF CORRECTION

PATENT NO. : 7,603,482 B2  Page 1 of 1
APPLICATION NO. : 11/112040
DATED : October 13, 2009
INVENTOR(S) : Horton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this

Fifth Day of October, 2010

David J. Kappos
*Director of the United States Patent and Trademark Office*